(12) United States Patent
Wang et al.

(10) Patent No.: US 11,595,883 B2
(45) Date of Patent: Feb. 28, 2023

(54) WIRELESS COMMUNICATION METHODS AND CORRESPONDING BASE STATIONS AND USER TERMINALS

(71) Applicant: NTT DOCOMO, INC., Tokyo (JP)

(72) Inventors: Jing Wang, Beijing (CN); Hanning Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 95 days.

(21) Appl. No.: 16/963,394

(22) PCT Filed: Jan. 22, 2019

(86) PCT No.: PCT/CN2019/072622
§ 371 (c)(1),
(2) Date: Jul. 20, 2020

(87) PCT Pub. No.: WO2019/154061
PCT Pub. Date: Aug. 15, 2019

(65) Prior Publication Data
US 2021/0368426 A1    Nov. 25, 2021

(30) Foreign Application Priority Data

Feb. 8, 2018    (CN) .......................... 201810129213.2

(51) Int. Cl.
*H04W 4/00*    (2018.01)
*H04W 48/16*    (2009.01)
(Continued)

(52) U.S. Cl.
CPC ........... *H04W 48/16* (2013.01); *H04W 16/18* (2013.01); *H04W 24/02* (2013.01)

(58) Field of Classification Search
CPC ...... H04W 48/16; H04W 16/18; H04W 24/02
(Continued)

(56) References Cited

U.S. PATENT DOCUMENTS

2019/0279515 A9 * 9/2019 Damnjanovic ......... B64C 39/02
2020/0033849 A1 * 1/2020 Yiu ....................... G05D 1/0607

FOREIGN PATENT DOCUMENTS

CN    102215473 A    10/2011

OTHER PUBLICATIONS

International Search Report for corresponding International Application No. PCT/CN2019/072622, dated Apr. 22, 2019 (2 pages).
(Continued)

*Primary Examiner* — Temica M Beamer
(74) *Attorney, Agent, or Firm* — Osha Bergman Watanabe & Burton LLP (57) ABSTRACT

Provided are wireless communication methods and corresponding base stations and user terminals. The wireless communication method performed by the base station includes generating indication information indicating a support capability of the base station for user terminals of different heights and/or types; and transmitting the indication information to user terminals within a cell managed by the base station. The wireless communication method performed by the user terminal includes receiving indication information indicating a support capability of a base station for user terminals of different heights and/or types; and selecting a portion of information that matches its own height and/or type from the indication information.

15 Claims, 2 Drawing Sheets

400

Receiving indication information indicating a support capability of a base station for user terminals of different heights and/or types — S401

Selecting a portion of information that matches its own height and/or type from the indication information — S402

(51) Int. Cl.
*H04W 16/18* (2009.01)
*H04W 24/02* (2009.01)

(58) Field of Classification Search
USPC .......................................................... 455/434
See application file for complete search history.

(56) References Cited

OTHER PUBLICATIONS

Written Opinion for corresponding International Application No. PCT/CN2019/072622, dated Apr. 22, 2019 (3 pages).

* cited by examiner

WIRELESS COMMUNICATION METHODS AND CORRESPONDING BASE STATIONS AND USER TERMINALS

TECHNICAL FIELD

The present disclosure relates to a field of wireless communication, and in particular to wireless communication methods, and corresponding base stations and user terminals.

BACKGROUND

In recent years, drones (or aerials or UAVs (Unmanned Aerial Vehicles)) have been widely used, and wireless communication networks, such as Long-Term Evolution (LTE) networks, may be used to support drone services due to good performance thereof, for example, to communicate with drones during drone flight, or to support terrestrial controllers/personnel to communicate with drones over wireless networks. Herein, a user terminal, such as a drone, capable of flying in the air and communicating with a base station through a wireless communication network may be referred to as an aerial user terminal.

Compared with a terrestrial user terminal, the aerial user terminal has different characteristics. First, the aerial user terminal is subject to more restrictions, such as flight restrictions including height restrictions, speed restrictions and/or whether flights are allowed, etc., and restrictions in different regions are different. In addition, compared to a terrestrial user terminal, the aerial user terminal has higher mobility due to its speed and height. Moreover, the height of the aerial user terminal often changes during takeoff and flight, thus facing variable wireless propagation conditions. Therefore, compared with a terrestrial user terminal, the aerial user terminal will be in a more complex wireless environment, and the aerial user terminal may cause stronger interference to the wireless communication network for being in the air. The above characteristics of the aerial user terminal bring up new challenges to its communication with the base station.

Therefore, a wireless communication network including a terrestrial user terminal and an aerial user terminal needs to be enhanced, so that both the terrestrial user terminal and the aerial user terminal can obtain good communication performance in the wireless communication network.

SUMMARY OF THE DISCLOSURE

According to one embodiment of the present disclosure, a wireless communication method performed by a base station is provided. The method comprises: generating indication information indicating a support capability of the base station for user terminals of different heights and/or types; and transmitting the indication information to user terminals within a cell managed by the base station.

According to another embodiment of the present disclosure, a base station is provided. The base station comprises: a generating unit configured to generate indication information indicating a support capability of the base station for user terminals of different heights and/or types; and a transmitting unit configured to transmit the indication information to user terminals within a cell managed by the base station.

According to another embodiment of the present disclosure, a wireless communication method performed by a user terminal is provided. The method comprises: receiving indication information indicating a support capability of a base station for user terminals of different heights and/or types; and selecting a portion of information that matches its own height and/or type from the indication information.

According to another embodiment of the present disclosure, a user terminal is provided. The user terminal comprises: a receiving unit configured to receive indication information indicating a support capability of a base station for user terminals of different heights and/or types; and a selecting unit configured to select a portion of information that matches its own height and/or type from the indication information.

BRIEF DESCRIPTION OF THE DRAWINGS

The above and other objectives, features and advantages of the present disclosure will become clearer by describing embodiments of the present disclosure in details in conjunction with accompanying drawings. The accompanying drawings are used to provide a further understanding of the embodiments of the present disclosure, constitute a part of this specification, and explain the present disclosure together with the embodiments of the present disclosure, but do not constitute a limitation on the present disclosure. In the accompanying drawings, like reference numerals usually represent like components or steps.

DESCRIPTION OF THE EMBODIMENTS

In order to make objectives, technical solutions and advantages of the present disclosure clearer, exemplary embodiments according to the present disclosure will be described in detail below with reference to the accompanying drawings.

First, a wireless communication system in which the embodiments of the present disclosure may be applied will be described with reference to FIG. 1. The wireless communication system may be an LTE system or any other type of wireless communication system, such as an LTE-A system or a 5G system. Hereinafter, the embodiments of the present disclosure will be described by using an LTE system as an example. However, it should be appreciated that the following description may also be applied to other types of wireless communication systems.

Figures 1, 2:
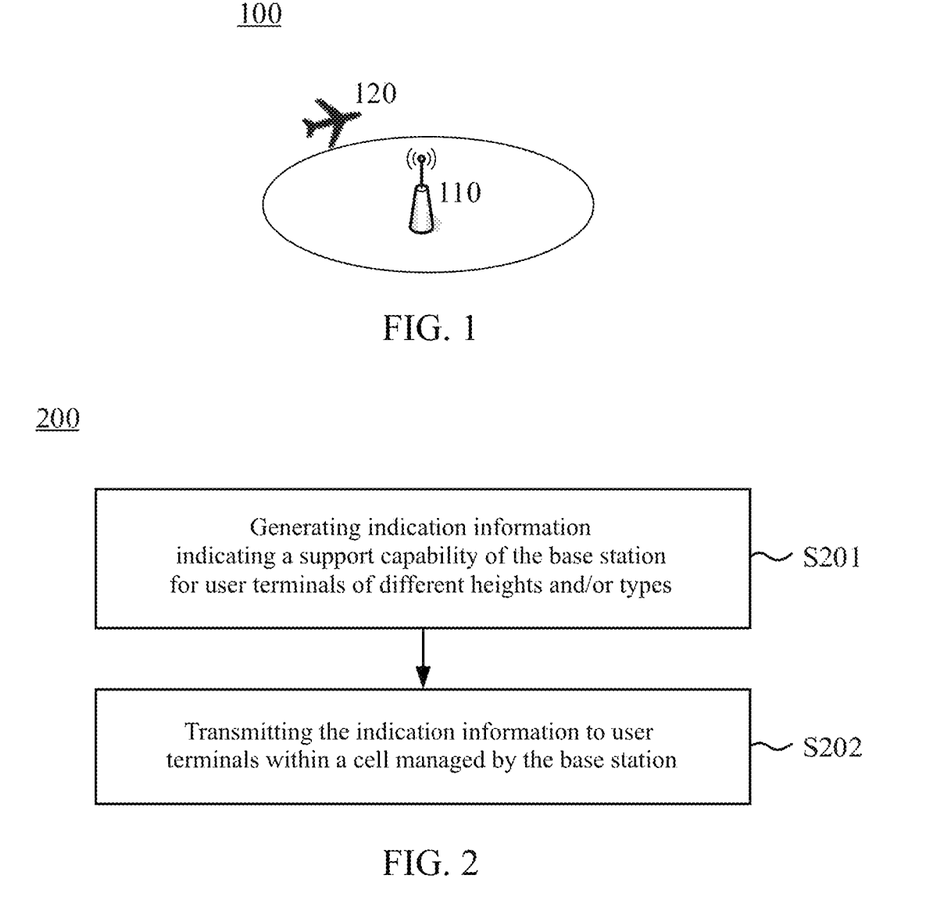
FIG. 1 is a schematic diagram of a wireless communication system in which the embodiments of the present disclosure may be applied.
FIG. 2 is a flowchart of a wireless communication method performed by a base station according to the embodiments of the present disclosure.

As shown in FIG. 1, the wireless communication system 100 may include a base station (BS) 110 and a user terminal 120, where the base station 110 is a serving base station for the user terminal 120. The user terminal 120 may be an aerial vehicle (AV) capable of flying in the air and communicating with the base station 110, such as a drone (or a UAV, such as a drone based on the Rel. 15 of 3GPP specification or an enhanced drone based on the Rel. 15 of 3GPP specification). Herein, a user equipment or user terminal capable of flying in the air and communicating wirelessly with a base station is referred to as an aerial user terminal (UT), and the aerial user terminal may also be interchangeably referred to as an aerial user equipment, an air user terminal, an air user equipment and the like. In addition, the user terminal 120 may also be a non-aerial user terminal, such as a terrestrial user terminal. It should be appreciated that although one base station and one user terminal are shown in FIG. 1, this is merely schematic. The wireless communication system may include a plurality of base stations and/or a plurality of user terminals, and accordingly, the wireless communication system may include a plurality of cells. In addition, hereinafter, a cell and a base station may sometimes be used interchangeably.

Some base stations among a plurality of base stations of the wireless communication system may merely support terrestrial user terminals or aerial user terminals, and other base stations among the plurality of base stations of the wireless communication system may support terrestrial user terminals and aerial user terminals. In addition, for a certain base station that supports aerial user terminals, it may support merely aerial user terminals at certain heights. In addition, the base station's support for terrestrial user terminals and/or aerial user terminals may also change, for example, accordingly as the number of user terminals in the wireless communication system changes. For example, when the number of aerial user terminals in the wireless communication system increases, a base station that does not support aerial user terminals may be configured to support aerial user terminals. Therefore, in order to optimize communication between the base station and user terminals, in the embodiments of the present disclosure, the base station may indicate its support capability for user terminals with different attributes (e.g., height, type, motion speed, capability level, etc.) to a user terminal, so that the user terminal determines whether it can access the base station. In addition, in the embodiments of the present disclosure, the base station may also transmit, to the user terminal, a list of cells for which user terminals with different attributes may perform measurement, to indicate that the user terminal merely needs to measure cells in the list.

In the present disclosure, "height" refers to a height of a user terminal relative to a reference object (for example, the ground); "type" refers to a classification of a user terminal, for example, the user terminal belongs to an aerial user terminal or a non-aerial user terminal (such as a terrestrial user terminal); "motion speed" refers to a displacement of a user terminal relative to a reference object (for example, the ground) in a unit time; "capability level" refers to a level of communication capability or processing capability that a user terminal can support, for example, a level of data processing capability, the maximum number of space division multiplexing, modulation and coding capability and the like that the user terminal can support.

The present disclosure is described below by taking the example in which the base station indicates its support capability for user terminals of different heights and/or types to a user terminal, and the base station transmits to the user terminal a list of cells for which user terminals of different height and/or types may perform measurement. However, it should be understood that the base station may also indicate its support capability for user terminal with attributes other than heights and types to the user terminal, and the base station may also transmit, to the user terminal, a list of cells for which user terminals with attributes other than heights and types may perform measurement.

Next, a wireless communication method performed by a base station according to the embodiments of the present disclosure will be described with reference to FIG. 2. FIG. 2 is a flowchart of a wireless communication method 200 performed by a base station according to the embodiments of the present disclosure. As shown in FIG. 2, in step S201, the base station generates indication information indicating a support capability of the base station for user terminals of different heights and/or types. In the present disclosure, the support capability of the base station for a user terminal may be, for example, that the base station supports the user terminal, or that the base station does not support the user terminal.

In a first implementation, in step S201, the base station may generate indication information indicating a support capability of the base station for user terminals of different heights.

In this implementation, the base station may determine one or more height ranges, and then generate the indication information indicating the support capability of the base station for user terminals whose heights are within the one or more height ranges. For example, the base station may determine 3 height ranges in advance, namely a first height range (0-50 meters), a second height range (50-100 meters), and a third height range (100-200 meters). In the case that the base station merely supports user terminals whose heights are within the first height range, the base station may generate indication information indicating that the base station supports user terminals whose heights are within the first height range, indication information indicating that the base station does not support user terminals whose heights are within the second height range, and indication information indicating that the base station does not support user terminals whose heights are within the third height range, respectively.

It should be appreciated that the base station does not need to generate corresponding indication information for each height range. For example, the base station may merely generate indication information indicating that the base station supports user terminals whose heights are within one or more height ranges, for example, the base station may merely generate indication information indicating that the base station supports user terminals whose heights are within the first height range. Alternatively, the base station may merely generate indication information indicating that the base station does not support user terminals whose heights are within one or more height ranges, for example, the base station may merely generate indication information indicating that the base station does not support user terminals whose heights are within the second height range and indication information indicating that the base station does not support user terminals whose heights are within the third height range.

Alternatively, in this implementation, the base station may also generate indication information indicating a support capability of the base station for user terminals of a specific height. For example, in the case that the base station supports user terminals with a height of 150 meters, the base station may generate indication information indicating that the base station supports user terminals with a height of 150 meters. For another example, in the case that the base station does not support user terminals with a height of 250 meters, the base station may generate indication information indicating that the base station does not support user terminals with a height of 250 meters.

In a second implementation, in step S201, the base station may generate indication information indicating a support capability of the base station for user terminals of different types.

For example, the base station may determine one or more types of user terminals in advance, and then generate indication information indicating the support capability of the base station for user terminals of the one or more types. For example, the base station may determine 2 types of user terminals in advance, namely aerial user terminals or non-aerial user terminals. In the case that the base station merely supports aerial user terminals, the base station may generate indication information indicating that the base station supports aerial user terminals and indication information indicating that the base station does not support non-aerial user terminals.

In a third implementation, in step S201, the base station may generate indication information indicating a support capability of the base station for user terminals of different heights and types.

In this implementation, the base station may determine one or more height ranges and one or more types of user terminals, and then generate indication information indicating a support capability of the base station for various types of user terminals within the one or more height ranges. For example, the base station may determine 3 height ranges in advance, namely a first height range (0-50 meters), a second height range (50-100 meters) and a third height range (100-200 meters), and determine 2 types of user terminals, namely aerial user terminals or non-aerial user terminals. In the case that the base station merely supports aerial user terminals whose heights are within the second height range, the base station may generate indication information indicating that the base station does not support aerial user terminals whose heights are within the first height range, indication information indicating that the base station does not support non-aerial user terminals whose heights are within the first height range, indication information indicating that the base station supports aerial user terminals whose heights are within the second height range, indication information indicating that the base station does not support non-aerial user terminals whose heights are within the second height range, indication information indicating that the base station does not support aerial user terminals whose heights are within the third height range, and indication information indicating that the base station does not support non-aerial user terminals whose heights are within the third height range, respectively.

Alternatively, in this implementation, the base station may also generate indication information indicating a support capability of the base station to specific user terminals of a specific height. For example, in the case that the base station supports aerial user terminals with a height of 150 meters, the base station may generate indication information indicating that the base station supports aerial user terminals with a height of 150 meters. For another example, in the case that the base station does not support aerial user terminals with a height of 250 meters, the base station may generate indication information indicating that the base station does not support aerial user terminals with a height of 250 meters.

It should be understood that although the above three implementations describe that the base station may: generate a plurality of pieces of indication information for user terminals of a plurality of heights, and various pieces of indication information indicate a support capability of the base station for user terminals of various heights, respectively; or generate a plurality of pieces of indication information for a plurality of types of user terminals, and various pieces of indication information indicate a support capability of the base station for various types of user terminals; or generate a plurality of pieces of indication information for a plurality of types of user terminals of a plurality of heights, and various pieces of indication information indicate a support capability of the base station for various types of user terminals of various heights, this disclosure is not limited thereto. According to other implementations, the base station may generate one piece of indication information for user terminals of a plurality of heights and the one piece of indication information may indicate a support capability of the base station for user terminals of the plurality of heights; or generate one piece of indication information for a plurality of types of user terminals and the one piece of indication information may indicate a support capability of the base station for various types of user terminals; or generate one piece of indication information for a plurality types of user terminals of a plurality of heights, and the one piece of indication information may indicate a support capability of the base station for various types of user terminals of various heights.

It should also be understood that although the above three implementations describe that the base station can merely support user terminals of one height/height range, or one type of user terminals, or one type of user terminals of one height/height range, the present disclosure is not limited thereto. According to other examples of the present disclosure, the base station may support user terminals of two or more heights/height ranges, or two or more types of user terminals, or two or more types of user terminals of one height/height range, or one type of user terminals of two heights/height ranges and the like.

For the indication information in step S201, in a first example, the indication information may be access restriction information indicating access restrictions set by the base station for user terminals of different heights and/or types. For example, in the above first implementation, the indication information may be access restriction information indicating access restrictions set by the base station for user terminals of different heights. For another example, in the above second implementation, the indication information may be access restriction information indicating access restrictions set by the base station for user terminals of different types. For another example, in the above third implementation, the indication information may be access restriction information indicating access restrictions set by the base station for user terminals of different heights and types.

In this example, the access restriction information may be, for example, information about whether the base station allows a user terminal to access. When the base station supports the user terminal, the access restriction information may be, for example, information that the base station allows residence/cell selection/reselection/access for the user terminal; when the base station does not support the user terminal, the access restriction information may be, for example, information that the base station does not allow residence/cell selection/reselection/access for the user terminal. For user terminals of various heights and/or types, the base station may respectively use one or more bits as the access restriction information, and set different values for the one or more bits, respectively, to represent whether the base station allows user terminals of various height and/or types to access. Then, after the base station transmits the access restriction information to the user terminal, the user terminal may determine whether the base station supports a user terminal of its own height and/or type to access according to the access restriction information.

For example, for user terminals of a certain height and/or type, the access restriction information may be the parameter "cellBarred". The parameter "cellBarred" occupies 1 bit and different values of the bit occupied by the parameter "cellBarred" represent whether the base station allows residence/cell selection/reselection/access for user terminals of a certain height and/or type. For example, when a value of the parameter "cellBarred" is a first value (such as 0, which means "barred"), it represents that the base station does not allow residence/cell selection/reselection/access for user terminals of the height and/or type; when a value of the parameter "cellBarred" is a second value (such as 1, which means "not barred"), it represents that the base station allows residence/cell selection/reselection/access for user terminals of the height and/or type. Then, after the base station transmits the parameter "cellBarred" to a user terminal, the user terminal may determine access restrictions of the base station for user terminals of the height and/or type according to the value of the parameter "cellBarred", so that the user terminal may determine whether operations such as cell selection/reselection/access can be performed for the base station.

It should be understood that when the first value herein is 0, it represents that the base station completely prohibits residence/cell selection/reselection/access for user terminals of the height and/or type; and when the second value is 1, it represents that the base station fully supports residence/cell selection/reselection/access for user terminals of the height and/or type. However, it should be appreciated that values of the first value and the second value may not be 0 or 1, and may be any real number between 0 and 1, to represent that the base station does not completely prohibit or fully support residence/cell selection/reselection/access for user terminals of a certain height and/or type. For example, the first value may be 0.5, to represent that a probability of user terminals of a certain height and/or type performing residing/cell-selecting/reselecting/accessing to the base station is 50%.

For another example, for user terminals of a certain height and/or type, the access restriction information may be the parameter "cellBarred" and the parameter "cellReservedForOperatorUse". The parameter "cellBarred" and the parameter "cellReservedForOperatorUse" occupy a plurality of bits, where the parameter "cellBarred" represents whether the base station allows residence/cell selection/reselection/access for user terminals of a certain height and/or type, and when the parameter "cellBarred" represents that the base station does not prohibit residence/cell selection/reselection/access for user terminals of a certain height and/or type, the parameter "cellReservedForOperatorUse" further represents whether the base station allows residence/cell selection/reselection/access for user terminals of a certain height and/or type. The parameter "cellBarred" has been described above and will not be repeatedly described herein. Likewise, the parameter "cellReservedForOperatorUse" may also occupy 1 bit, and when a value of the parameter "cellReservedForOperatorUse" is a third value (such as 0, which means "not reserved"), it represents that the base station allows residence/cell selection/reselection/access for user terminals of the height and/or type; and when a value of the parameter "cellReservedForOperatorUse" is a fourth value (such as 1, which means "reserved"), it represents that the base station allows residence/cell selection/reselection/access for user terminals of the height and/or type and with an access category of 11 or 15.

Likewise, it should be appreciated that values of the third value and the fourth value may not be 0 or 1, and may be any real number between 0 and 1, to represent that the base station does not completely reserve or completely reserves residence/cell selection/reselection/access for user terminals of a certain height and/or type. For example, the third value may be 0.5, to represent that a probability of the base station reserving residence/cell selection/reselection/access for user terminals of a certain height and/or type is 50%.

That is, in this example, for user terminals of each height and/or type, the base station may adopt a group of parameters (at least one of "cellBarred" and "cellReservedForOperatorUse") as the access restriction information. Therefore, the base station may set various groups of parameters as corresponding access restriction information for user terminals of various heights and/or types, respectively. Then, the base station may transmit the various groups of parameters to a user terminal, so that the user terminal determines access restrictions of the base station for user terminals of its own height and/or type. When transmitting the various groups of parameters to the user terminal, the base station may perform the transmission through first system information, which will be described in a later step S202.

For the indication information in step S201, in a second example, the indication information may be capability category information indicating accessible categories (Access Classes/ACDC categories) set by the base station for user terminals of different heights and/or types. For example, in the above first implementation, the indication information may be capability category information indicating accessible categories set by the base station for user terminals of different heights. For another example, in the above second implementation, the indication information may be capability category information indicating accessible categories set by the base station for user terminals of different types. For another example, in the above third implementation, the indication information may be capability category information indicating accessible categories set by the base station for user terminals of different heights and types.

In this example, the capability category information may be, for example, information about which categories of user terminals are allowed to access by the base station. When the base station supports a user terminal, the capability category information may be, for example, category information of user terminals that are allowed to access by the base station; when the base station does not support a user terminal, the access restriction information may be, for example, category information of user terminals that are not allowed to access by the base station. For one or more user terminals of a certain height and/or type, the base station may set a group of access category barring (AC-barring) factors as capability category information of the base station for the one or more user terminals of the height and/or type, where a group of AC-barring factors includes one or more AC-barring factors. An AC-barring factor may be, for example, a capability category prohibition threshold, to indicate a value that an actual value of a capability category factor calculated by a user terminal when the user terminal accesses the base station should not exceed. For user terminals of a certain height and/or type with different capability levels, the base station may set an AC-barring factor corresponding to each capability level, respectively. Then, after the base station transmits the capability category information to a user terminal, the user terminal may calculate an actual value of an access category factor of the user terminal according to its own capability level, and determine whether the calculated actual value is less than a value of a received AC-barring factor set by the base station corresponding to the capability level of the user terminal, to decide whether it is possible to enter a connected (RRC_CONNECTED) state from an idle (RRC_IDLE) state in a cell corresponding to the base station. For example, if the decision is yes, the user terminal may enter the connected state from the idle state in a cell corresponding to the base station; and if the decision is no, then the user terminal cannot enter the connected state from the idle state in a cell corresponding to the base station. It should be understood that when the user terminal selects a cell for residence, the user terminal may ignore this information. Values of the "AC-barring" factors herein may be real numbers, for example, 0, 1 or real numbers between 0 and 1, which is not limited in this disclosure.

That is, in this example, for one or more user terminals of each height and/or type, the base station may adopt a group of AC-barring factors as the capability category information. Therefore, the base station may set a group of AC-barring factors as corresponding capability category information for one or more user terminals of each height and/or type, respectively. Then, the base station may transmit various groups of AC-barring factors to a user terminal, so that the user terminal determines whether the base station allows user terminals of its own category to access. When transmitting the various groups of AC-barring factors to the user terminal, the base station may perform the transmission through second system information, which will be described in a later step S202.

For the indication information in step S201, in a third example, the indication information may be combination information of capability category information and access restriction information. For example, for user terminals of a certain height and/or type, when the access restriction information in the indication information is the parameter "cellBarred" and a value of the parameter "cellBarred" represents that the base station allows residence/cell selection/reselection/access for user terminals of the height and/or type, the capability category information in the indication information may further indicate which categories of user terminals among the user terminals of the height and/or type are allowed to access by the base station. For another example, for user terminals of a certain height and/or type, when the access restriction information in the indication information is the parameter "cellBarred" and the parameter "cellReservedForOperatorUse", and a value of the parameter "cellReservedForOperatorUse" represents that the base station reserves residence/cell selection/reselection/access for user terminals of the height and/or type, the capability category information in the indication information may further indicate which categories of user terminals among the user terminals of the height and/or type are allowed to access by the base station.

In addition to generating the indication information indicating a support capability of the base station for user terminals of different heights and/or types, the base station may further generate information on a cell list, and the cell list is a list of cells for which user terminals of different heights and/or types perform measurement. Specifically, the cell list may be a list of cells for which user terminals of different heights and/or types perform measurement on one or more frequencies. For example, in the above first implementation, the cell list may be a list of cells for which user terminals of different heights perform measurement on one or more frequencies. For another example, in the above second implementation, the cell list may be a list of cells for which user terminals of different types perform measurement on one or more frequencies. For another example, in the above third implementation, the cell list may be a list of cells for which user terminals of different heights and types perform measurement on one or more frequencies. It should be appreciated that the base station may generate the information on a cell list when generating the indication information, or may generate the information on a cell list after generating the indication information, or may generate the information on a cell list before generating the indication information.

In this example, the cell list may be a list of cells for which user terminals of different heights and/or types perform intra-frequency measurement. For example, for user terminals of a plurality of heights and/or types, the cell list may be a list of cells that may be used for radio resource management (RRM) measurement for intra-frequency cell reselection or handover, and support user terminals of various heights and/or types. After receiving such information, a user terminal may select a cell in the cell list matching its own height and/or type to perform RRM measurement for intra-frequency cell reselection or handover. In addition, in this case, the cell list may be a list of cells for which user terminals of different heights and/or types perform intra-frequency measurement on one frequency, and the one frequency may be the same as a carrier frequency of a cell corresponding to the base station.

Alternatively, in this example, the cell list may also be a list of cells for which user terminals of different heights and/or types perform inter-frequency measurement. In this case, the base station may further generate information on frequencies for which user terminals of different heights and/or types perform inter-frequency measurement. For example, for user terminals of a plurality of heights and/or types, the cell list may be a list of cells used for available frequencies for RRM measurement for inter-frequency cell reselection or handover of user terminals of various heights and/or types and supported by each frequency. After receiving such information, a user terminal may select a frequency and a cell list that matches its own height and/or type, and then perform inter-frequency RRM measurement on the corresponding frequency and cell for inter-frequency cell reselection or handover. In addition, in this case, the cell list may be a list of cells for which user terminals of different heights and/or types perform inter-frequency measurement on one or more frequencies, and the one or more frequencies may be different from a carrier frequency of a cell corresponding to the base station.

The "cell list" described herein may be a part of or all cells in a neighbor cell list (NCL) maintained by the base station, or a part of or all cells in a neighbor relation table (NRT) maintained by the base station. For user terminals of different heights and/or types, the base station may select different numbers of cells from NCL or NRT to inform users to perform RRM measurement. For example, the base station may select different numbers of cells from NCL or NRT according to a location of the user terminal, a load status of neighboring cells, and/or a network status of the communication system, etc., to inform users to perform RRM measurement. For example, when an aerial user terminal is in a low height range, since obstacles between the aerial user terminal and the base station increases, the aerial user terminal in this height range may not have communication conditions for line-of-sight transmission, and may face a same transmission environment as a terrestrial user terminal. Therefore, for the aerial user terminal in this height range, more cells may be selected for the aerial user terminal to perform RRM measurement, to ensure that the aerial user terminal obtains good communication. For another example, when an aerial user terminal is in a high height range, since obstacles between the aerial user terminal and the base station decreases, only a few base stations are needed to ensure that the aerial user terminal obtains good communication, and thus fewer cells may be selected for the aerial user terminal to perform RRM measurement.

In addition, it should be understood that for user terminals of different heights and/or types, the base station may also select the same number of cells from NCL or NRT for RRM measurement.

In addition, for user terminals of different heights and/or types, the base station may also select different cells from NCL or NRT for RRM measurement, and the number of the different cells may be the same or different. For example, the base station may select cells with different geographic locations from NCL or NRT for RRM measurement according to a height and a motion direction of the user terminal, and the number of the cells with different geographic locations may be the same or different.

It has been described above that the base station generates the indication information indicating the support capability of the base station for user terminals of different heights and/or types, and the list of cells for which measurement is available and is provided for user terminals of different heights and/or types by the base station. According to other examples of the present disclosure, for a certain height and/or type of the user terminal, the indication information or the cell list generated by the base station at different times may be different. For example, the number of user terminals in the wireless communication system may be different at different times, and when the number of aerial user terminals in the system increases at a certain time, a base station that does not originally support aerial user terminals may be configured to support aerial user terminals, and then the base station may generate new indication information to indicate that the base station supports aerial user terminals. Certainly, it should be understood that the base station may also generate a new cell list.

In addition, in the above description, the base station generates the indication information or the cell list for user terminals of different heights and/or types, but the present disclosure is not limited thereto. The base station may generate indication information or a cell list for user terminals with different attributes, where the attributes include any one or more of heights, types, motion speeds, and capability levels of the user terminals.

Then, in step S202, the base station transmits the indication information to user terminals within a cell managed by the base station. The cell managed by the base station may be one or more. For example, the cell may be a macro cell, or may be a combination of a macro cell and a plurality of small cells.

According to one example of the present disclosure, in step S202, the base station may broadcast one or more pieces of indication information generated in step S201 to user terminals within a cell managed by it. For example, the base station may broadcast the indication information generated in step S201 to user terminals within a cell managed by the base station on a broadcast channel. Accordingly, all user terminals within the cell managed by the base station may receive the indication information of the base station for user terminals of different heights and/or types. Then, a user terminal within the cell managed by the base station may select a portion of information matching its own height and/or type from the received indication information, so as to perform residence/cell selection/reselection/access, RRM measurement and the like.

According to another example of the present disclosure, the base station may broadcast the indication information to user terminals within a cell managed by the base station through system information. For example, as mentioned above, when the indication information is access restriction information indicating access restrictions of the base station to user terminals of different heights and/or types, the base station may transmit the access restriction information to a user terminal through first system information; when the indication information is capability category information indicating accessible categories of the base station for user terminals of different heights and/or types, the base station may transmit the capability category information to a user terminal through second system information.

In this example, the base station may broadcast the indication information as system information to user terminals within the cell managed by the base station through one or more system information blocks (SIBs). In an LTE system, SIB 1 to SIB 13 have been defined to transmit various system information. However, since the LTE system does not distinguish heights and/or types of user terminals, system information transmitted by the base station to user terminals of different heights and/or types is the same. In the present disclosure, in order to improve communication between user terminals of different heights and/or types and the base station, user terminals of different heights and/or types are distinguished, and the base station generates the indication information for user terminals of different heights and/or types in step S201. Therefore, in the present disclosure, the base station may modify SIBs in the LTE system to transmit the indication information generated in step S201.

For example, the base station may add one or more bits to a SIB in the LTE system, and different values of the one or more bits are used to identify that the SIB corresponds to user terminals of different heights and/or types. As mentioned above, when the indication information is access restriction information indicating access restrictions of the base station to user terminals of different heights and/or types, the base station may set a group of parameters (for example, "cellBarred" and "cellReservedForOperatorUse") for user terminals of each height and/or type, respectively, as corresponding access restriction information. In this case, the base station may determine SIB 1 for user terminals of each height and/or type, respectively. Moreover, the determined SIB 1 may include not only the group of parameters set by the base station for user terminals of the height and/or type (for example, "cellBarred" and "cellReservedForOperatorUse"), but also identification information, where the identification information may identify that the SIB1 corresponds to user terminals of the height and/or type.

In addition, as also mentioned above, when the indication information is capability category information indicating accessible categories of the base station for user terminals of different heights and/or types, the base station may set a group of AC-barring factors for user terminals of each height and/or type, respectively, as capability category information. In this case, the base station may determine SIB 2 for user terminals of each height and/or type, respectively. Moreover, the determined SIB 2 may include not only the group of AC-barring factors set by the base station for user terminals of the height and/or type, but also identification information, where the identification information may identify that the SIB 2 corresponds to user terminals of the height and/or type.

It should be appreciated that the base station may not modify SIBs in the LTE system, but define one or more new SIBs to transmit the indication information generated in step S201.

According to another example of the present disclosure, in step S202, the base station may transmit the indication information generated in step S201 to user terminals within a cell managed by the base station through radio resource control (RRC) signaling. Accordingly, the user terminals may receive the indication information generated by the base station by receiving the RRC signaling. Alternatively, in this example, the base station may also transmit the indication information generated in step S201 by using system information and RRC signaling in combination. Accordingly, the user terminals may receive the indication information generated by the base station by receiving a combination of the system information and the RRC signaling.

In addition, according to other examples of the present disclosure, the cell list generated by the base station mentioned above may also be transmitted to user terminals in the manner as described in the above examples. For example, the base station may broadcast the generated cell list to user terminals within a cell managed by it. For example, the base station may broadcast the cell list to user terminals within the cell managed by the base station through system information. For another example, the base station may also transmit the generated cell list to user terminals within the cell managed by the base station through RRC signaling. For another example, the base station may also transmit the generated cell list by using system information and RRC signaling in combination.

With the above embodiment of the present disclosure, the base station distinguishes user terminals of different heights and/or types, and generates the indication information or the cell list for user terminals of different heights and/or types, so that a user terminal may select a portion of information matching its own height and/or type from the received indication information or cell list, to selectively perform operations such as residence/cell selection/access, RRM measurement and the like, thereby improving communication between user terminals of different heights and/or types and the base station and ensuring that user terminals of different heights and/or types may obtain good communication.

Figure 3:
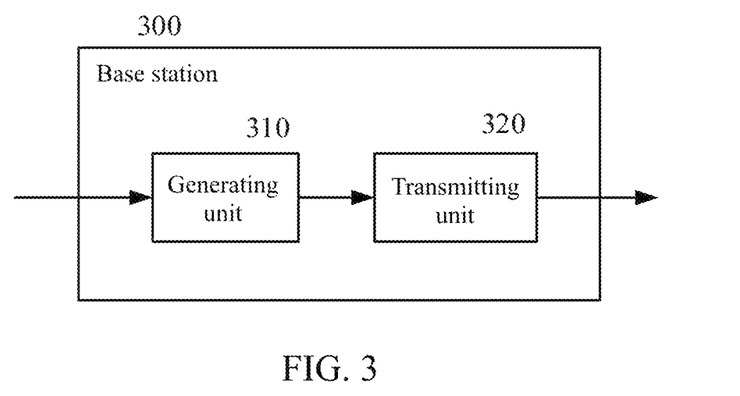
FIG. 3 is a block diagram of a base station according to the embodiments of the present disclosure.

A base station that performs the method 200 shown in FIG. 2 according to the embodiments of the present disclosure will be described below with reference to FIG. 3. FIG. 3 shows a block diagram of a base station 300 according to the embodiments of the present disclosure. Since functions of the base station 300 are the same as the details of the method 200 described above with reference to FIG. 2, a detailed description of the same content is omitted herein for simplicity.

As shown in FIG. 3, the base station 300 includes a generating unit 310 configured to generate indication information indicating a support capability of the base station for user terminals of different heights and/or types; and a transmitting unit 320 configured to transmit the indication information to user terminals within a cell managed by the base station. The base station 300 may further include other units in addition the above two units, but since these units are not related to the present disclosure, a description of these units is omitted.

In the present disclosure, the support capability of the base station for a user terminal may be, for example, that the base station supports the user terminal, or that the base station does not support the user terminal.

In a first implementation, the generating unit 310 may generate indication information indicating a support capability of the base station for user terminals of different heights.

In this implementation, the generating unit 310 may determine one or more height ranges, and then generate the indication information indicating the support capability of the base station for user terminals whose heights are within the one or more height ranges. For example, the generating unit 310 may determine 3 height ranges in advance, namely a first height range (0-50 meters), a second height range (50-100 meters), and a third height range (100-200 meters). In the case that the base station merely supports user terminals whose heights are within the first height range, the generating unit 310 may generate indication information indicating that the base station supports user terminals whose heights are within the first height range, indication information indicating that the base station does not support user terminals whose heights are within the second height range, and indication information indicating that the base station does not support user terminals whose heights are within the third height range, respectively.

It should be appreciated that the generating unit 310 does not need to generate corresponding indication information for each height range. For example, the generating unit 310 may merely generate indication information indicating that the base station supports user terminals whose heights are within one or more height ranges, for example, the generating unit 310 may merely generate indication information indicating that the base station supports user terminals whose heights are within the first height range. Alternatively, the generating unit 310 may merely generate indication information indicating that the base station does not support user terminals whose heights are within one or more height ranges, for example, the generating unit 310 may merely generate indication information indicating that the base station does not support user terminals whose heights are within the second height range and indication information indicating that the base station does not support user terminals whose heights are within the third height range. The following implementations are similar and will not be repeatedly described herein Alternatively, in this implementation, the generating unit 310 may also generate indication information indicating a support capability of the base station for user terminals of a specific height. For example, in the case that the base station supports user terminals with a height of 150 meters, the generating unit 310 may generate indication information indicating that the base station supports user terminals with a height of 150 meters. For another example, in the case that the base station does not support user terminals with a height of 250 meters, the generating unit 310 may generate indication information indicating that the base station does not support user terminals with a height of 250 meters.

In a second implementation, the generating unit 310 may generate indication information indicating a support capability of the base station for user terminals of different types.

For example, the generating unit 310 may determine one or more types of user terminals in advance, and then generate indication information indicating the support capability of the base station for user terminals of the one or more types. For example, the generating unit 310 may determine 2 types of user terminals in advance, namely aerial user terminals or non-aerial user terminals. In the case that the base station merely supports aerial user terminals, the generating unit 310 may generate indication information indicating that the base station supports aerial user terminals and indication information indicating that the base station does not support non-aerial user terminals.

In a third implementation, the generating unit 310 may generate indication information indicating a support capability of the base station for user terminals of different heights and types.

In this implementation, the generating unit 310 may determine one or more height ranges and one or more types of user terminals, and then generate indication information indicating a support capability of the base station for various types of user terminals within the one or more height ranges. For example, the generating unit 310 may determine 3 height ranges in advance, namely a first height range (0-50 meters), a second height range (50-100 meters) and a third height range (100-200 meters), and determine 2 types of user terminals, namely aerial user terminals or non-aerial user terminals. In the case that the base station merely supports aerial user terminals whose heights are within the second height range, the generating unit 310 may generate indication information indicating that the base station does not support aerial user terminals whose heights are within the first height range, indication information indicating that the base station does not support non-aerial user terminals whose heights are within the first height range, indication information indicating that the base station supports aerial user terminals whose heights are within the second height range, indication information indicating that the base station does not support non-aerial user terminals whose heights are within the second height range, indication information indicating that the base station does not support aerial user terminals whose heights are within the third height range, and indication information indicating that the base station does not support non-aerial user terminals whose heights are within the third height range, respectively.

Alternatively, in this implementation, the generating unit 310 may also generate indication information indicating a support capability of the base station to specific user terminals of a specific height. For example, in the case that the base station supports aerial user terminals with a height of 150 meters, the generating unit 310 may generate indication information indicating that the base station supports aerial user terminals with a height of 150 meters. For another example, in the case that the base station does not support aerial user terminals with a height of 250 meters, the generating unit 310 may generate indication information indicating that the base station does not support aerial user terminals with a height of 250 meters.

For the indication information generated by the generating unit 301, in a first example, the indication information may be access restriction information indicating access restrictions set by the base station for the user terminals of different heights and/or types. For example, in the above first implementation, the indication information may be access restriction information indicating access restrictions set by the base station for user terminals of different heights. For another example, in the above second implementation, the indication information may be access restriction information indicating access restrictions set by the base station for user terminals of different types. For another example, in the above third implementation, the indication information may be access restriction information indicating access restrictions set by the base station for user terminals of different heights and types.

In this example, the access restriction information may be, for example, information about whether the base station allows a user terminal to access. When the base station supports the user terminal, the access restriction information may be, for example, information that the base station allows residence/cell selection/reselection/access for the user terminal; when the base station does not support the user terminal, the access restriction information may be, for example, information that the base station does not allow residence/cell selection/reselection/access for the user terminal. For user terminals of various heights and/or types, the base station may respectively use one or more bits as the access restriction information, and set different values for the one or more bits, respectively, to represent whether the base station allows user terminals of various height and/or types to access. Then, after the base station transmits the access restriction information to the user terminal, the user terminal may determine whether the base station supports a user terminal of its own height and/or type to access according to the access restriction information.

For example, for user terminals of a certain height and/or type, the access restriction information may be the parameter "cellBarred". The parameter "cellBarred" occupies 1 bit and different values of the bit occupied by the parameter "cellBarred" represent whether the base station allows residence/cell selection/reselection/access for user terminals of a certain height and/or type. For example, when a value of the parameter "cellBarred" is a first value (such as 0, which means "barred"), it represents that the base station does not allow residence/cell selection/reselection/access for user terminals of the height and/or type; when a value of the parameter "cellBarred" is a second value (such as 1, which means "not barred"), it represents that the base station allows residence/cell selection/reselection/access for user terminals of the height and/or type. Then, after the base station transmits the parameter "cellBarred" to a user terminal, the user terminal may determine access restrictions of the base station for user terminals of the height and/or type according to the value of the parameter "cellBarred", so that the user terminal may determine whether operations such as cell selection/reselection/access can be performed for the base station.

It should be understood that when the first value herein is 0, it represents that the base station completely prohibits residence/cell selection/reselection/access for user terminals of the height and/or type; and when the second value is 1, it represents that the base station fully supports residence/cell selection/reselection/access for user terminals of the height and/or type. However, it should be appreciated that values of the first value and the second value may not be 0 or 1, and may be any real number between 0 and 1, to represent that the base station does not completely prohibit or fully support residence/cell selection/reselection/access for user terminals of a certain height and/or type. For example, the first value may be 0.5, to represent that a probability of user terminals of a certain height and/or type performing residing/cell-selecting/reselecting/accessing the base station is 50%.

For another example, for user terminals of a certain height and/or type, the access restriction information may be the parameter "cellBarred" and the parameter "cellReservedForOperatorUse". The parameter "cellBarred" and the parameter "cellReservedForOperatorUse" occupy a plurality of bits, where the parameter "cellBarred" represents whether the base station allows residence/cell selection/reselection/access for user terminals of a certain height and/or type, and when the parameter "cellBarred" represents that the base station does not prohibit residence/cell selection/reselection/access for user terminals of a certain height and/or type, the parameter "cellReservedForOperatorUse"

further represents whether the base station allows residence/cell selection/reselection/access for user terminals of a certain height and/or type. The parameter "cellBarred" has been described above and will not be repeatedly described herein. Likewise, the parameter "cellReservedForOperatorUse" may also occupy 1 bit, and when a value of the parameter "cellReservedForOperatorUse" is a third value (such as 0, which means "not reserved"), it represents that the base station allows residence/cell selection/reselection/access for user terminals of the height and/or type; and when a value of the parameter "cellReservedForOperatorUse" is a fourth value (such as 1, which means "reserved"), it represents that the base station allows residence/cell selection/reselection/access for user terminals of the height and/or type and with an access category of 11 or 15.

Likewise, it should be appreciated that values of the third value and the fourth value may not be 0 or 1, and may be any real number between 0 and 1, to represent that the base station does not completely reserve or completely reserves residence/cell selection/reselection/access for user terminals of a certain height and/or type. For example, the third value may be 0.5, to represent that a probability of the base station reserving residence/cell selection/reselection/access for user terminals of a certain height and/or type is 50%.

That is, in this example, for user terminals of each height and/or type, the base station may adopt at least one of a group of parameters ("cellBarred" and "cellReservedForOperatorUse") as the access restriction information. Therefore, the base station may set various groups of parameters as corresponding access restriction information for user terminals of various heights and/or types, respectively. Then, the base station may transmit the various groups of parameters to a user terminal, so that the user terminal determines access restrictions of the base station for user terminals of its own height and/or type. When transmitting the various groups of parameters to the user terminal, the base station may perform the transmission through first system information, which will be described below.

For the indication information generated by the generating unit 310, in a second example, the indication information may be capability category information indicating accessible categories (Access Classes/ACDC categories) set by the base station for user terminals of different heights and/or types. For example, in the above first implementation, the indication information may be capability category information indicating accessible categories set by the base station for user terminals of different heights. For another example, in the above second implementation, the indication information may be capability category information indicating accessible categories set by the base station for user terminals of different types. For another example, in the above third implementation, the indication information may be capability category information indicating accessible categories set by the base station for user terminals of different heights and types.

In this example, the capability category information may be, for example, information about which categories of user terminals are allowed to access by the base station. When the base station supports a user terminal, the capability category information may be, for example, category information of user terminals that are allowed to access by the base station; when the base station does not support a user terminal, the access restriction information may be, for example, category information of user terminals that are not allowed to access by the base station. For one or more user terminals of a certain height and/or type, the base station may set a group of access category barring (AC-barring) factors as capability category information of the base station for the one or more user terminals of the height and/or type, where a group of AC-barring factors includes one or more AC-barring factors. An AC-barring factor may be, for example, a capability category prohibition threshold, to indicate a value that an actual value of a capability category factor calculated by a user terminal when the user terminal accesses the base station should not exceed. For user terminals of a certain height and/or type with different capability levels, the base station may set an AC-barring factor corresponding to each capability level, respectively. Then, after the base station transmits the capability category information to a user terminal, the user terminal may calculate an actual value of an access category factor of the user terminal according to its own capability level, and determine whether the calculated actual value is less than a value of a received AC-barring factor set by the base station corresponding to the capability level of the user terminal, to decide whether it is possible to enter a connected (RRC_CONNECTED) state from an idle (RRC_IDLE) state in a cell corresponding to the base station. It should be understood that when the user terminal selects a cell for residence, the user terminal may ignore this information. Values of the "AC-barring" factors herein may be real numbers, for example, 0, 1 or real numbers between 0 and 1, which is not limited in this disclosure.

That is, in this example, for one or more user terminals of each height and/or type, the base station may adopt a group of AC-barring factors as the capability category information. Therefore, the base station may set a group of AC-barring factors as corresponding capability category information for one or more user terminals of each height and/or type, respectively. Then, the base station may transmit various groups of AC-barring factors to a user terminal, so that the user terminal determines whether the base station allows user terminals of its own category to access. When transmitting the various groups of AC-barring factors to the user terminal, the base station may perform the transmission through second system information, which will be described below.

For the indication information generated by the generating unit 310, in a third example, the indication information may be combination information of capability category information and access restriction information. For example, for user terminals of a certain height and/or type, when the access restriction information in the indication information is the parameter "cellBarred" and a value of the parameter "cellBarred" represents that the base station allows residence/cell selection/reselection/access for user terminals of the height and/or type, the capability category information in the indication information may further indicate which categories of user terminals among the user terminals of the height and/or type are allowed to access by the base station. For another example, for user terminals of a certain height and/or type, when the access restriction information in the indication information is the parameter "cellBarred" and the parameter "cellReservedForOperatorUse", and a value of the parameter "cellReservedForOperatorUse" represents that the base station reserves residence/cell selection/reselection/access for user terminals of the height and/or type, the capability category information in the indication information may further indicate which categories of user terminals among the user terminals of the height and/or type are allowed to access by the base station.

In addition to generating the indication information indicating a support capability of the base station for user terminals of different heights and/or types, the generating unit 310 may further generate information on a cell list, and the cell list is a list of cells for which user terminals of different heights and/or types perform measurement. Specifically, the cell list may be a list of cells for which user terminals of different heights and/or types perform measurement on one or more frequencies. For example, in the above first implementation, the cell list may be a list of cells for which user terminals of different heights perform measurement on one or more frequencies. For another example, in the above second implementation, the cell list may be a list of cells for which user terminals of different types perform measurement on one or more frequencies. For another example, in the above third implementation, the cell list may be a list of cells for which user terminals of different heights and types perform measurement on one or more frequencies. It should be appreciated that the base station may generate the information on a cell list when generating the indication information, or may generate the information on a cell list after generating the indication information, or may generate the information on a cell list before generating the indication information.

In this example, the cell list may be a list of cells for which user terminals of different heights and/or types perform intra-frequency measurement. For example, for user terminals of a plurality of heights and/or types, the cell list may be a list of cells that may be used for radio resource management (RRM) measurement for intra-frequency cell reselection or handover, and support user terminals of various heights and/or types. After receiving such information, a user terminal may select a cell in the cell list matching its own height and/or type to perform RRM measurement for intra-frequency cell reselection or handover. In addition, in this case, the cell list may be a list of cells for which user terminals of different heights and/or types perform intra-frequency measurement on one frequency, and the one frequency may be the same as a carrier frequency of a cell corresponding to the base station.

Alternatively, in this example, the cell list may also be a list of cells for which user terminals of different heights and/or types perform inter-frequency measurement. In this case, the base station may further generate information on frequencies for which user terminals of different heights and/or types perform inter-frequency measurement. For example, for user terminals of a plurality of heights and/or types, the cell list may be a list of cells used for available frequencies for RRM measurement for inter-frequency cell reselection or handover of user terminals of various heights and/or types and supported by each frequency. After receiving such information, a user terminal may select a frequency and a cell list that matches its own height and/or type, and then perform inter-frequency RRM measurement on the corresponding frequency and cell for inter-frequency cell reselection or handover. In addition, in this case, the cell list may be a list of cells for which user terminals of different heights and/or types perform inter-frequency measurement on one or more frequencies, and the one or more frequencies may be different from a carrier frequency of a cell corresponding to the base station.

In addition, in the above description, the generating unit 310 generates the indication information or the cell list for user terminals of different heights and/or types, but the present disclosure is not limited thereto. The generating unit 310 may generate indication information or a cell list for user terminals with different attributes, where the attributes include any one or more of heights, types, motion speeds, and capability levels of the user terminals.

According to one example of the present disclosure, the transmitting unit 320 may broadcast one or more pieces of indication information generated by the generating unit 310 to user terminals within a cell managed by it. For example, the transmitting unit 320 may broadcast the indication information generated by the generating unit 310 to user terminals within a cell managed by it on a broadcast channel. Accordingly, all user terminals within the cell managed by the base station may receive the indication information of the base station for user terminals of different heights and/or types. Then, a user terminal within the cell managed by the base station may select a portion of information matching its own height and/or type from the received indication information, so as to perform residence/cell selection/reselection/access, RRM measurement and the like.

According to another example of the present disclosure, the transmitting unit 320 may broadcast the indication information to user terminals within a cell managed by the base station through system information. For example, as mentioned above, when the indication information is access restriction information indicating access restrictions of the base station to user terminals of different heights and/or types, the base station may transmit the access restriction information to a user terminal through first system information; when the indication information is capability category information indicating accessible categories of the base station for user terminals of different heights and/or types, the base station may transmit the capability category information to a user terminal through second system information.

In this example, the transmitting unit 320 may broadcast the indication information as system information to user terminals within the cell managed by the base station through one or more system information blocks (SIBs). In an LTE system, SIB 1 to SIB 13 have been defined to transmit various system information. However, since the LTE system does not distinguish heights and/or types of user terminals, system information transmitted by the base station to user terminals of different heights and/or types is the same. In the present disclosure, in order to improve communication between user terminals of different heights and/or types and the base station, user terminals of different heights and/or types are distinguished, and the base station generates the indication information for user terminals of different heights and/or types in step S201. Therefore, in the present disclosure, the base station may modify SIBs in the LTE system to transmit the indication information generated by the generating unit 310.

For example, the base station may add one or more bits to a SIB in the LTE system, and different values of the one or more bits are used to identify that the SIB corresponds to user terminals of different heights and/or types. As mentioned above, when the indication information is access restriction information indicating access restrictions of the base station to user terminals of different heights and/or types, the base station may set a group of parameters (for example, "cellBarred" and "cellReservedForOperatorUse") for user terminals of each height and/or type, respectively, as corresponding access restriction information. In this case, the base station may determine SIB 1 for user terminals of each height and/or type, respectively. Moreover, the determined SIB 1 may include not only the group of parameters set by the base station for user terminals of the height and/or type (for example, "cellBarred" and "cellReservedForOperatorUse"), but also identification information, where the identification information may identify that the SIB1 corresponds to user terminals of the height and/or type. Herein, information transmitted through SIB 1 may be the first system information mentioned above.

In addition, as also mentioned above, when the indication information is capability category information indicating accessible categories of the base station for user terminals of different heights and/or types, the base station may set a group of AC-barring factors for user terminals of each height and/or type, respectively, as capability category information. In this case, the transmitting unit 320 may determine SIB 2 for user terminals of each height and/or type, respectively. Moreover, the determined SIB 2 may include not only the group of AC-barring factors set by the base station for user terminals of the height and/or type, but also identification information, where the identification information may identify that the SIB 2 corresponds to user terminals of the height and/or type. Herein, information transmitted through SIB 2 may be the second system information mentioned above.

In addition, according to other examples of the present disclosure, the cell list generated by the generating unit 310 mentioned above may also be transmitted to user terminals in the manner as described in the above examples. For example, the transmitting unit 320 may broadcast the generated cell list to user terminals within a cell managed by it, for example, the transmitting unit 320 may broadcast the cell list to user terminals within the cell managed by the base station through system information. For another example, the transmitting unit 320 may also transmit the generated cell list to user terminals within the cell managed by the base station through RRC signaling. For another example, the transmitting unit 320 may also transmit the generated cell list by using system information and RRC signaling in combination.

With the above embodiment of the present disclosure, the base station distinguishes user terminals of different heights and/or types, and generates the indication information or the cell list for user terminals of different heights and/or types, so that a user terminal may select a portion of information matching its own height and/or type from the received indication information or cell list, to selectively perform operations such as residence/cell selection/access, RRM measurement and the like, thereby improving communication between user terminals of different heights and/or types and the base station and ensuring that user terminals of different heights and/or types may obtain good communication.

Figure 4:
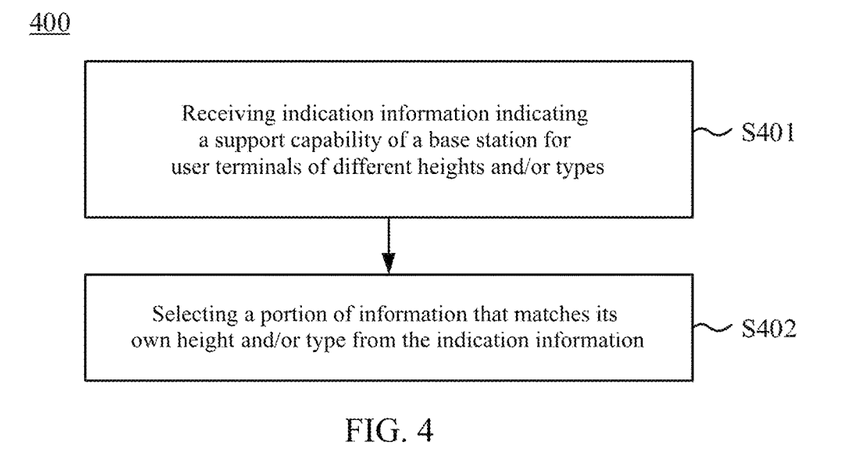
FIG. 4 is a flowchart of a wireless communication method performed by a user terminal according to the embodiments of the present disclosure.

Next, a wireless communication method on the receiving side corresponding to the method 200 shown in FIG. 2 according to the embodiments of the present disclosure will be described with reference to FIG. 4. FIG. 4 is a flowchart of a wireless communication method 400 performed by a user terminal according to the embodiments of the present disclosure. Since the details of the method 400 is the same as that of the method 200 described above with reference to FIG. 2, a detailed description of the same content is omitted herein for simplicity.

As shown in FIG. 4, in step S401, the user terminal receives indication information indicating a support capability of a base station for user terminals of different heights and/or types; and then, in step S402, selects a portion of information that matches its own height and/or type from the indication information.

For example, in step S401, the user terminal may receive a plurality of pieces of indication information, which are indication information of the base station for user terminals of various heights and/or types, respectively. Then, in step S402, the user terminal may select one piece of indication information that matches its own height and/or type from the plurality of pieces of indication information. Then, the user terminal may determine a support capability of the base station for user terminals of its own height and/or type according to the selected indication information. When the base station supports user terminals of its own height and/or type to access, the user terminal may perform operations such as residence/cell selection/access and the like; and when the base station provides a list of cells for which measurement is available for user terminals of its own height and/or type, the user terminal may perform operations such as RRM measurement and the like for cells in the cell list. In addition, when the base station does not support user terminals of its own height and/or type to access, the user terminal may perform RRM measurement through the cell list provided by the base station, select a cell from the cell list, and then try to perform operations such as residence/cell selection/access and the like for the selected cell.

For the indication information in step S401, in a first example, the indication information may be access restriction information indicating access restrictions set by the base station for user terminals of different heights and/or types. The access restriction information may be, for example, information about whether the base station allows the user terminal to access. For example, for user terminals of various heights and/or types, the base station may adopt one or more bits as the access restriction information, respectively, and set different values for the one or more bits, respectively, to represent whether the base station allows user terminals of various heights and/or types to access. Then, after the base station transmits the access restriction information to the user terminal, the user terminal may determine whether the base station supports user terminals of its own height and/or type to access according to the access restriction information.

For the indication information in step S401, in a second example, the indication information may be capability category information indicating accessible categories (Access Classes/ACDC categories) set by the base station for user terminals of different heights and/or types. The capability category information may be, for example, information about which categories of user terminals are allowed to access by the base station. For one or more user terminals of a certain height and/or type, the base station may set a group of access category barring (AC-barring) factors as capability category information of the base station for the one or more user terminals of the height and/or type, where a group of AC-barring factors includes one or more AC-barring factors. An AC-barring factor may be, for example, a capability category prohibition threshold, to indicate a value that an actual value of a capability category factor calculated by a user terminal when the user terminal accesses the base station should not exceed. For user terminals of a certain height and/or type with different capability levels, the base station may set an AC-barring factor corresponding to each capability level, respectively. Then, after the base station transmits the capability category information to the user terminal, the user terminal may calculate an actual value of an access category factor of the user terminal according to its own capability level, and determine whether the calculated actual value is less than a value of a received AC-barring factor set by the base station corresponding to the capability level of the user terminal, to decide whether it is possible to enter a connected (RRC_CONNECTED) state from an idle (RRC_IDLE) state in a cell corresponding to the base station.

For the indication information in step S401, in a third example, the indication information may be combination information of capability category information and access restriction information.

In addition to receiving the indication information indicating a support capability of the base station for user terminals of different heights and/or types, the user terminal may further receive information on a cell list generated by the base station, and the cell list is a list of cells for which user terminals of different heights and/or types perform measurement. Specifically, the cell list may be a list of cells for which user terminals of different heights and/or types perform measurement on one or more frequencies.

In this example, the cell list may be a list of cells for which user terminals of different heights and/or types perform intra-frequency measurement. For example, for user terminals of a plurality of heights and/or types, the cell list may be a list of cells that may be used for radio resource management (RRM) measurement for intra-frequency cell reselection or handover, and support user terminals of various heights and/or types. After receiving such information, the user terminal may select a cell in the cell list matching its own height and/or type to perform RRM measurement for intra-frequency cell reselection or handover. In addition, in this case, the cell list may be a list of cells for which user terminals of different heights and/or types perform intra-frequency measurement on one frequency, and the one frequency may be the same as a carrier frequency of a cell corresponding to the base station.

Alternatively, in this example, the cell list may also be a list of cells for which user terminals of different heights and/or types perform inter-frequency measurement. In this case, the base station may further generate information on frequencies for which user terminals of different heights and/or types perform inter-frequency measurement. For example, for user terminals of a plurality of heights and/or types, the cell list may be a list of cells used for available frequencies for RRM measurement for inter-frequency cell reselection or handover of user terminals of various heights and/or types and supported by each frequency. After receiving such information, the user terminal may select a frequency and a cell list that matches its own height and/or type, and then perform inter-frequency RRM measurement on the corresponding frequency and cell for inter-frequency cell reselection or handover. In addition, in this case, the cell list may be a list of cells for which user terminals of different heights and/or types perform inter-frequency measurement on one or more frequencies, and the one or more frequencies may be different from a carrier frequency of a cell corresponding to the base station.

In addition, the user terminal performing the method 400 shown in FIG. 4 may be in the RRC-IDLE state.

With the above embodiment of the present disclosure, the base station distinguishes user terminals of different heights and/or types, and generates the indication information or the cell list for user terminals of different heights and/or types, so that the user terminal may select a portion of information matching its own height and/or type from the received indication information or cell list, to selectively perform operations such as residence/cell selection/access, RRM measurement and the like, thereby improving communication between user terminals of different heights and/or types and the base station and ensuring that user terminals of different heights and/or types may obtain good communication.

Figure 5:
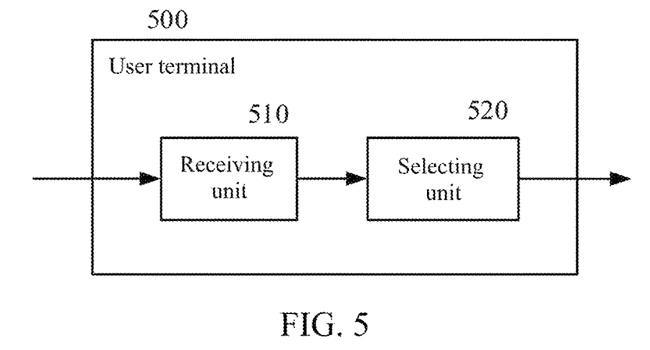
FIG. 5 is a block diagram of a user terminal according to the embodiments of the present disclosure.

A user terminal that performs the method 400 shown in FIG. 4 according to the embodiments of the present disclosure will be described below with reference to FIG. 5. FIG. 5 shows a block diagram of a user terminal 500 according to the embodiments of the present disclosure. Since functions of the user terminal 500 are the same as the details of the method 400 described above with reference to FIG. 4, a detailed description of the same content is omitted herein for simplicity.

As shown in FIG. 5, the user terminal 500 includes: a receiving unit 510 configured to receive indication information indicating a support capability of a base station for user terminals of different heights and/or types; and a selecting unit 520 configured to select a portion of information that matches its own height and/or type from the indication information. The user terminal 00 may further include other units in addition the above two units, but since these units are not related to the present disclosure, a description of these units is omitted.

For example, the receiving unit 510 may receive a plurality of pieces of indication information, which are indication information of the base station for user terminals of various heights and/or types, respectively. Then, the selecting unit 520 may select one piece of indication information that matches its own height and/or type from the plurality of pieces of indication information. Then, the user terminal may determine a support capability of the base station for user terminals of its own height and/or type according to the selected indication information. When the base station supports user terminals of its own height and/or type to access, the user terminal may perform operations such as residence/cell selection/access and the like; and when the base station provides a list of cells for which measurement is available for user terminals of its own height and/or type, the user terminal may perform operations such as RRM measurement and the like for cells in the cell list. In addition, when the base station does not support user terminals of its own height and/or type to access, the user terminal may perform RRM measurement through the cell list provided by the base station, select a cell from the cell list, and then try to perform operations such as residence/cell selection/access and the like for the selected cell.

In a first example, the indication information may be access restriction information indicating access restrictions set by the base station for user terminals of different heights and/or types. The access restriction information may be, for example, information about whether the base station allows the user terminal to access. For example, for user terminals of various heights and/or types, the base station may adopt one or more bits as the access restriction information, respectively, and set different values for the one or more bits, respectively, to represent whether the base station allows user terminals of various heights and/or types to access. Then, after the base station transmits the access restriction information to the user terminal, the user terminal may determine whether the base station supports user terminals of its own height and/or type to access according to the access restriction information.

In a second example, the indication information may be capability category information indicating accessible categories (Access Classes/ACDC categories) set by the base station for user terminals of different heights and/or types. The capability category information may be, for example, information about which categories of user terminals are allowed to access by the base station. For one or more user terminals of a certain height and/or type, the base station may set a group of access category barring (AC-barring) factors as capability category information of the base station for the one or more user terminals of the height and/or type, where a group of AC-barring factors includes one or more AC-barring factors. An AC-barring factor may be, for example, a capability category prohibition threshold, to indicate a value that an actual value of a capability category factor calculated by a user terminal when the user terminal accesses the base station should not exceed. For user terminals of a certain height and/or type with different capability levels, the base station may set an AC-barring factor corresponding to each capability level, respectively. Then, after the base station transmits the capability category information to the user terminal, the user terminal may calculate an actual value of an access category factor of the user terminal according to its own capability level, and determine whether the calculated actual value is less than a value of a received AC-barring factor set by the base station corresponding to the capability level of the user terminal, to decide whether it is possible to enter a connected (RRC_CONNECTED) state from an idle (RRC_IDLE) state in a cell corresponding to the base station.

In addition to receiving the indication information indicating a support capability of the base station for user terminals of different heights and/or types, the receiving unit 510 may further receive information on a cell list generated by the base station, and the cell list is a list of cells for which user terminals of different heights and/or types perform measurement.

In this example, the cell list may be a list of cells for which user terminals of different heights and/or types perform intra-frequency measurement. For example, for user terminals of a plurality of heights and/or types, the cell list may be a list of cells that may be used for radio resource management (RRM) measurement for intra-frequency cell reselection or handover, and support user terminals of various heights and/or types. After receiving such information, the user terminal may select a cell in the cell list matching its own height and/or type to perform RRM measurement for intra-frequency cell reselection or handover.

Alternatively, in this example, the cell list may also be a list of cells for which user terminals of different heights and/or types perform inter-frequency measurement. In this case, the base station may further generate information on frequencies for which user terminals of different heights and/or types perform inter-frequency measurement. For example, for user terminals of a plurality of heights and/or types, the cell list may be a list of cells used for available frequencies for RRM measurement for inter-frequency cell reselection or handover of user terminals of various heights and/or types and supported by each frequency. After receiving such information, the user terminal may select a frequency and a cell list that matches its own height and/or type, and then perform inter-frequency RRM measurement on the corresponding frequency and cell for inter-frequency cell reselection or handover.

With the above embodiment of the present disclosure, the base station distinguishes user terminals of different heights and/or types, and generates the indication information or the cell list for user terminals of different heights and/or types, so that the user terminal may select a portion of information matching its own height and/or type from the received indication information or cell list, to selectively perform operations such as residence/cell selection/access, RRM measurement and the like, thereby improving communication between user terminals of different heights and/or types and the base station and ensuring that user terminals of different heights and/or types may obtain good communication.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. via wire and/or wireless), and the respective functional blocks may be implemented by these apparatuses.

Figure 6:
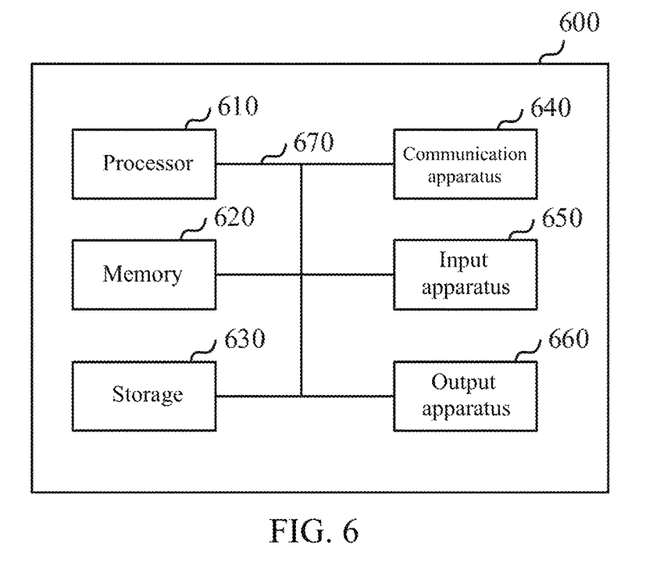
FIG. 6 is a schematic diagram of a hardware structure of a base station and a user terminal according to the embodiments of the present disclosure.

For example, the base station, the user terminal and the like in one embodiment of the present disclosure may function as a computer that executes the processes of the wireless communication method of the present disclosure. FIG. 6 is a diagram illustrating an example of a hardware structure of a wireless base station and a user terminal involved in one embodiment of the present disclosure. The wireless base station 300 and the user terminal 500 described above may be constituted as a computer apparatus 600 that physically comprises a processor 610, a memory 620, a storage 630, a communication apparatus 640, an input apparatus 650, an output apparatus 660, a bus 670 and the like In addition, in the following description, terms such as "apparatus" may be replaced with circuits, devices, units, and the like. The hardware structure of the wireless base station 300 and the user terminal 500 may include one or more of the respective apparatuses shown in the figure, or may not include a part of the apparatuses.

For example, only one processor 610 is illustrated, but there may be a plurality of processors. Furthermore, processes may be performed by one processor, or processes may be performed by more than one processor simultaneously, sequentially, or by other methods. In addition, the processor 601 may be installed by more than one chip.

Respective functions of the wireless base station 300 and the user terminal 500 may be implemented, for example, by reading specified software (program) on hardware such as the processor 610 and the memory 620, so that the processor 610 performs computations, controls communication performed by the communication apparatus 640, and controls reading and/or writing of data in the memory 620 and the storage 630.

The processor 610, for example, operates an operating system to control the entire computer. The processor 610 may be constituted by a Central Processing Unit (CPU), which includes interfaces with peripheral apparatuses, a control apparatus, a computing apparatus, a register and the like. For example, the accessing unit, the maintaining unit and the like described above may be implemented by the processor 610.

In addition, the processor 610 reads programs (program codes), software modules and data from the storage 630 and/or the communication apparatus 640 to the memory 620, and execute various processes according to them. As for the program, a program causing computers to execute at least a part of the operations described in the above embodiments may be employed. For example, the accessing unit of the user terminal 500 may be implemented by a control program stored in the memory 620 and operated by the processor 610, and other functional blocks may also be implemented similarly.

The memory 620 is a computer-readable recording medium, and may be constituted, for example, by at least one of a Read Only Memory (ROM), an Erasable Programmable ROM (EPROM), an Electrically EPROM (EEPROM), a Random-Access Memory (RAM) and other appropriate storage media. The memory 620 may also be referred to as a register, a cache, a main memory (a main storage apparatus) and the like. The memory 620 may store executable programs (program codes), software modules and the like for implementing the wireless communication method involved in one embodiment of the present disclosure.

The storage 630 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 630 may also be referred to as an auxiliary storage apparatus.

The communication apparatus 640 is a hardware (transceiver device) performing communication between computers via a wired and/or wireless network, and is also referred to as a network device, a network controller, a network card, a communication module and the like, for example. The communication apparatus 640 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 640.

The input apparatus 650 is an input device (e.g., a keyboard, a mouse, a microphone, a switch, a button, a sensor and the like) that receives input from the outside. The output apparatus 660 is an output device (e.g., a display, a speaker, a Light Emitting Diode (LED) light and the like) that performs outputting to the outside. In addition, the input apparatus 650 and the output apparatus 660 may also be an integrated structure (e.g., a touch screen).

Furthermore, the respective apparatuses such as the processor 610 and the memory 620 are connected by the bus 670 that communicates information. The bus 670 may be constituted by a single bus or by different buses between the apparatuses.

Furthermore, the wireless base station 300 and the user terminal 500 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 610 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS) ", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions provided by the above wireless base station 300 may be regarded as functions provided by the user terminal 500. Furthermore, the words "uplink" and "downlink" may also be replaced with "side". For example, an uplink channel may be replaced with a side channel.

Also, the user terminal in this specification may be replaced with a wireless base station. At this time, functions provided by the above user terminal 500 may be regarded as functions provided by the wireless base station 300.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 2000, UMB (Ultra Mobile Broadband), IEEE 802.11 (Wi-Fi), IEEE 802.16 (WiMAX®), IEEE 802.20, UWB (Ultra-Wide Band), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A method performed by a terminal, comprising:
   receiving indication information indicating a support capability of a base station for terminals of different heights and/or types;
   selecting a portion of information that matches its own height and/or type from the indication information; and
   determining the support capability of the base station for terminals of its own height and/or type according to the selected portion of information.

2. The method of claim 1, wherein the indication information is access restriction information indicating access restrictions set by the base station for the terminals of different heights and/or types.

3. The method of claim 1, wherein the indication information is capability category information indicating accessible categories set by the base station for the terminals of different heights and/or types.

4. The method of claim 1, further comprising:
   receiving information on a cell list, the cell list being a list of cells for which the terminals of different heights and/or types perform measurement.

5. A base station, comprising:
   a generating unit configured to generate indication information indicating a support capability of the base station for terminals of different heights and/or types; and
   a transmitting unit configured to transmit the indication information to terminals within a cell managed by the base station,
   wherein the indication information is used by a terminal to select a portion of information that matches its own height and/or type from the indication information and to determine the support capability of the base station for terminals of its own height and/or type according to the selected portion of information.

6. The base station of claim 5, wherein the indication information is access restriction information indicating access restrictions set by the base station for the terminals of different heights and/or types.

7. The base station of claim 5, wherein the indication information is capability category information indicating accessible categories set by the base station for the terminals of different heights and/or types.

8. The base station of claim 5, wherein the generating unit is further configured to generate information on a cell list, the cell list being a list of cells for which the terminals of different heights and/or types perform measurement.

9. The base station of claim 5, wherein the transmitting unit is further configured to broadcast the indication information to the terminals within the cell managed by the base station.

10. A terminal, comprising:
    a receiving unit configured to receive indication information indicating a support capability of a base station for terminals of different heights and/or types;
    a selecting unit configured to select a portion of information that matches its own height and/or type from the indication information; and
    a determining unit configured to determine the support capability of the base station for terminals of its own height and/or type according to the selected portion of information.

11. The terminal of claim 10, wherein the indication information is access restriction information indicating access restrictions set by the base station for the terminals of different heights and/or types.

12. The terminal of claim 10, wherein the indication information is capability category information indicating accessible categories set by the base station for the terminals of different heights and/or types.

13. The terminal of claim 10, wherein the receiving unit is further configured to receive information on a cell list, the cell list being a list of cells for which the terminals of different heights and/or types perform measurement.

14. The base station of claim 8, wherein the cell list is a list of cells for which the terminals of different heights and/or types perform intra-frequency measurement.

15. The base station of claim 8, wherein the generating unit is further configured to generate information on frequencies for which the terminals of different heights and/or types perform inter-frequency measurement, wherein the cell list is a list of cells for which the terminals of different heights and/or types perform inter-frequency measurement.

* * * * *